(12) United States Patent
Kato et al.

(10) Patent No.: US 8,695,177 B2
(45) Date of Patent: Apr. 15, 2014

(54) CLIP

(75) Inventors: Makoto Kato, Toyota (JP); Haruhisa Kamiya, Anjo (JP); Toshio Iwahara, Okazaki (JP); Hideyuki Kawaguchi, Okazaki (JP)

(73) Assignee: Daiwa Kasei Kogyo Kabushiki Kaisha, Aichi-ken (JP)

( * ) Notice: Subject to any disclaimer, the term of this patent is extended or adjusted under 35 U.S.C. 154(b) by 93 days.

(21) Appl. No.: 13/016,563

(22) Filed: Jan. 28, 2011

(65) Prior Publication Data

US 2011/0197405 A1 Aug. 18, 2011

(30) Foreign Application Priority Data

Jan. 29, 2010 (JP) ................................. 2010-018349

(51) Int. Cl.
*A44B 11/25* (2006.01)
(52) U.S. Cl.
USPC ............... 24/297; 24/292; 24/581.11; 24/458
(58) Field of Classification Search
USPC ........... 24/289, 292, 297, 458, 581.11, 588.1, 24/457; 411/45, 46, 508, 41; 296/1.08, 296/214
See application file for complete search history.

(56) References Cited

U.S. PATENT DOCUMENTS

| | | | |
|---|---|---|---|
| 4,927,287 A | 5/1990 | Ohkawa et al. | |
| 5,775,860 A * | 7/1998 | Meyer | 411/46 |
| 6,769,849 B2 * | 8/2004 | Yoneoka | 411/45 |
| 6,874,983 B2 * | 4/2005 | Moerke et al. | 411/46 |
| 6,910,840 B2 * | 6/2005 | Anscher | 411/41 |
| 6,955,514 B2 * | 10/2005 | Hoshi | 411/508 |
| 7,273,227 B2 * | 9/2007 | Kawai et al. | 280/730.2 |
| 7,841,817 B2 * | 11/2010 | Kawai | 411/45 |
| 8,043,038 B2 * | 10/2011 | Sano | 411/45 |
| 2003/0129040 A1 * | 7/2003 | Arisaka | 411/41 |
| 2004/0020016 A1 * | 2/2004 | Yoneoka | 24/297 |
| 2004/0247410 A1 * | 12/2004 | Anscher et al. | 411/45 |
| 2005/0062263 A1 * | 3/2005 | Kawai et al. | 280/728.2 |
| 2008/0014045 A1 * | 1/2008 | Kawai | 411/45 |

FOREIGN PATENT DOCUMENTS

| | | |
|---|---|---|
| EP | 1 375 931 A1 | 1/2004 |
| EP | 1 878 925 A2 | 1/2008 |
| JP | 2001-193718 | 7/2001 |
| JP | 2005-155738 A | 6/2005 |

* cited by examiner

*Primary Examiner* — Robert J Sandy
*Assistant Examiner* — Abigail Morrell
(74) *Attorney, Agent, or Firm* — Christensen Fonder P.A.

(57) ABSTRACT

A clip may include a main body and a pin member. In the clip, an engagement condition of the anchor to an attaching hole formed in a plate member can be maintained by inserting an elastic shank portion of the pin member into the anchor of the main body. The elastic shank portion inserted into the anchor is received by a stopper of the anchor, so that the pin member can be locked in a temporary insertion position. An interfering portion of the elastic shank portion is exposed to an exterior portion the anchor. When the anchor is inserted into the attaching hole, the interfering portion of the elastic shank portion interferes with a periphery of the attaching hole, so that a condition in which the pin member is locked in the temporary insertion position can be released.

3 Claims, 4 Drawing Sheets

CLIP

BACKGROUND OF THE INVENTION

The present invention relates to a plug or clip that is capable of being attached to an attaching hole formed in a vehicle body plate or other such plate members. More specifically, the present invention relates to a clip that is constructed of a main body and a pin member and is capable of being attached to an attaching hole, in which the pin member is inserted into an interior of an anchor of the main body after the anchor is inserted into the attaching hole, so as to secure the anchor in the attaching hole.

A known clip of this type is taught by, for example, Japanese Laid-Open Patent Publication Number 2001-193718. The clip is constructed of a grommet (anchor) that is capable of being inserted into an attaching hole formed in a vehicle body panel (plate member), and a pin member having a shank portion that is capable of being inserted into a hollow portion of the anchor. Upon insertion of the shank portion of the pin member into the hollow portion of the anchor after the anchor is inserted or fitted into the attaching hole, a pair of engagement claws formed in the anchor can spread and engage a periphery of the attaching hole, so that the anchor can be secured in the attaching hole. Thus, the clip can be attached to the attaching hole.

In the known clip, if the shank portion of the pin member is inserted into the hollow portion of the anchor in a condition in which the anchor is not sufficiently inserted or fitted into the attaching hole (i.e., in a half or insufficient fitting condition of the anchor), the anchor cannot be sufficiently secured in the attaching hole. Thus, the clip cannot be reliably attached to the attaching hole. That is, the clip cannot have a desired support load.

Generally, the clip is used to close a hole formed in a vehicle roof panel. In such a case, if the clip is attached to the hole while the anchor is not sufficiently inserted into the hole, the clip can be dropped off from the hole when an impact is applied thereto caused by, for example, actuation of roof air-bag. Therefore, in order to prevent the clip from being dropped off from the hole, it is necessary to make sure whether the clip is attached to the hole while the anchor is sufficiently inserted into the hole. This may lead to increased steps for attaching the clip to the hole.

Thus, there is a need in the art for an improved clip.

BRIEF SUMMARY OF THE INVENTION

In one aspect of the present invention, a clip may include a main body and a pin member. The clip is constructed such that a hollow anchor of the main body can engage an attaching hole formed in a desired plate member by inserting the anchor into the attaching hole and that an engagement condition of the anchor to the attaching hole can be maintained by inserting an elastic shank portion of the pin member into an interior portion of the anchor. The elastic shank portion of the pin member inserted into the anchor of the main body is received by stoppers of the anchor, so that the pin member can be locked in a temporary insertion position. Interfering portions of the elastic shank portion is exposed to an exterior portion of the anchor. Further, when the anchor is inserted into the attaching hole of the plate member, the interfering portions of the elastic shank portion interfere with a periphery of the attaching hole and as a result, the elastic shank portion is flexed inwardly, so that the elastic shank portion can be spaced from the stoppers of the anchor, thereby releasing a condition in which the pin member is locked in the temporary insertion position.

According to the clip thus constructed, in a temporary joined condition in which the pin member is locked in the temporary insertion position, the condition in which the pin member is locked in the temporary insertion position can be released only when the anchor of the main body is suitably pressed into the attaching hole of the plate member, so that the elastic shank portion can be inserted into the anchor from the temporary insertion position toward a final position. Therefore, it is possible to know if the anchor of the main body is suitably inserted into the attaching hole based upon whether the elastic shank portion of the pin member can be completely inserted into the anchor (i.e., whether the elastic shank portion can be inserted into the final position in the anchor). As a result, it is not necessary to additionally provide a step to know if the anchor is suitably inserted into the attaching hole.

Further, when the anchor is not adequately inserted into the attaching hole, the elastic shank portion of the pin member can be prevented from being inserted into the anchor from the temporary insertion position toward the final position. Therefore, the clip thus constructed is suitable for applying the attaching hole that is formed in the plate member such as a roof panel covered by a roof cushion (i.e., attaching hole that is not clearly seen externally.)

Other objects, features and advantage of the present inventions will be readily understood after reading the following detailed description together with the accompanying drawings and the claims.

DETAILED DESCRIPTION OF THE INVENTION

A detailed representative embodiment of the present invention is shown in FIGS. 1 to 6(C).

Generally, a roof panel of a vehicle body panel has a plurality of attaching holes that are formed therein in order to attach an assist grip thereto. However, some of these attaching holes will not be used in some models. A clip of the present invention is intended to close one of the attaching holes that are not used.

Figure 1:
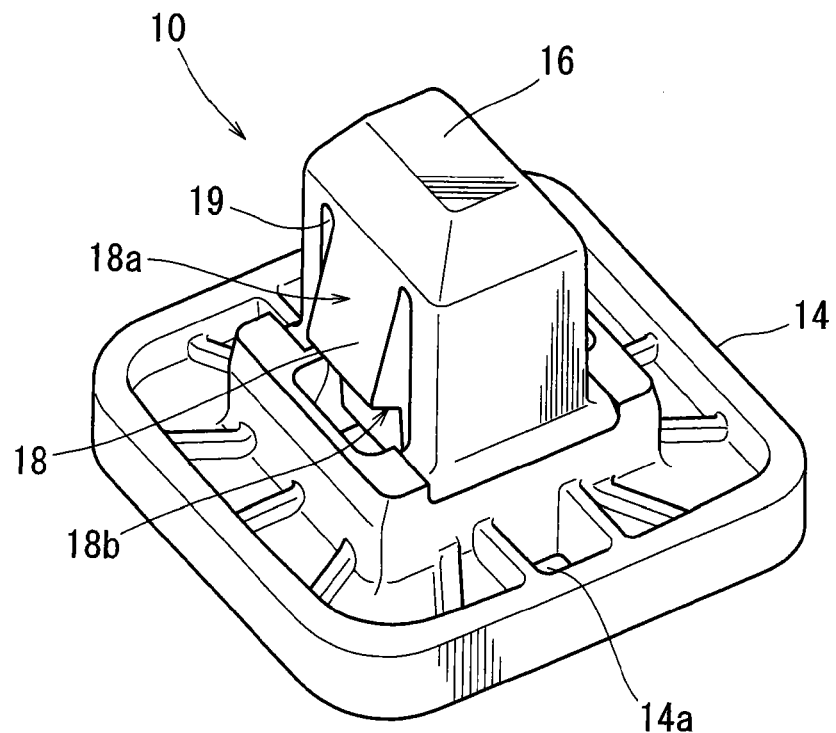
FIG. 1 is a perspective view of a main body of a clip according to a representative embodiment of the present invention.
Figure 2:
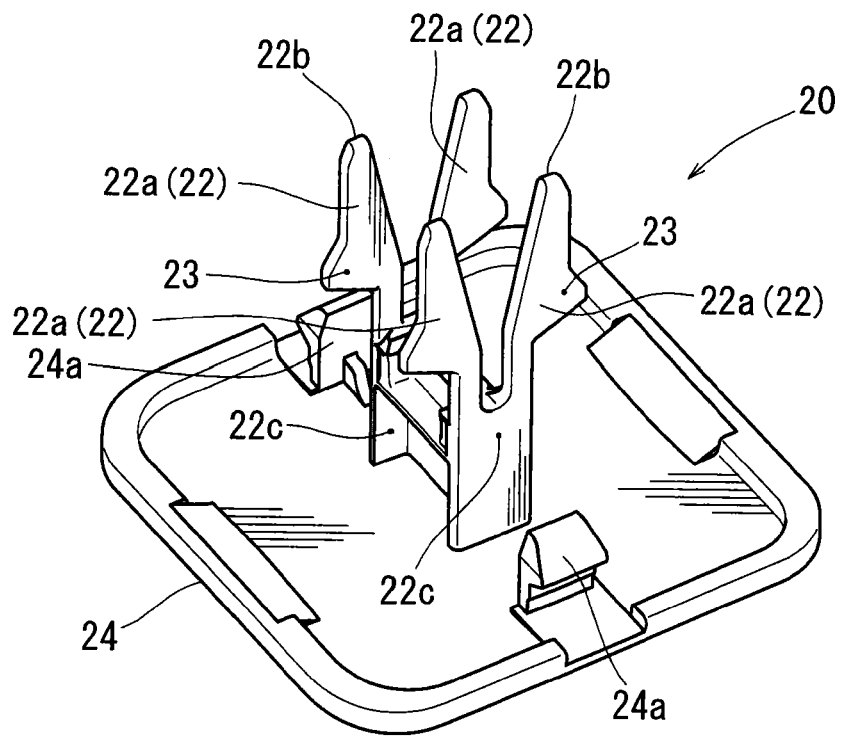
FIG. 2 is a perspective view of a pin member of the clip.
Figure 3:
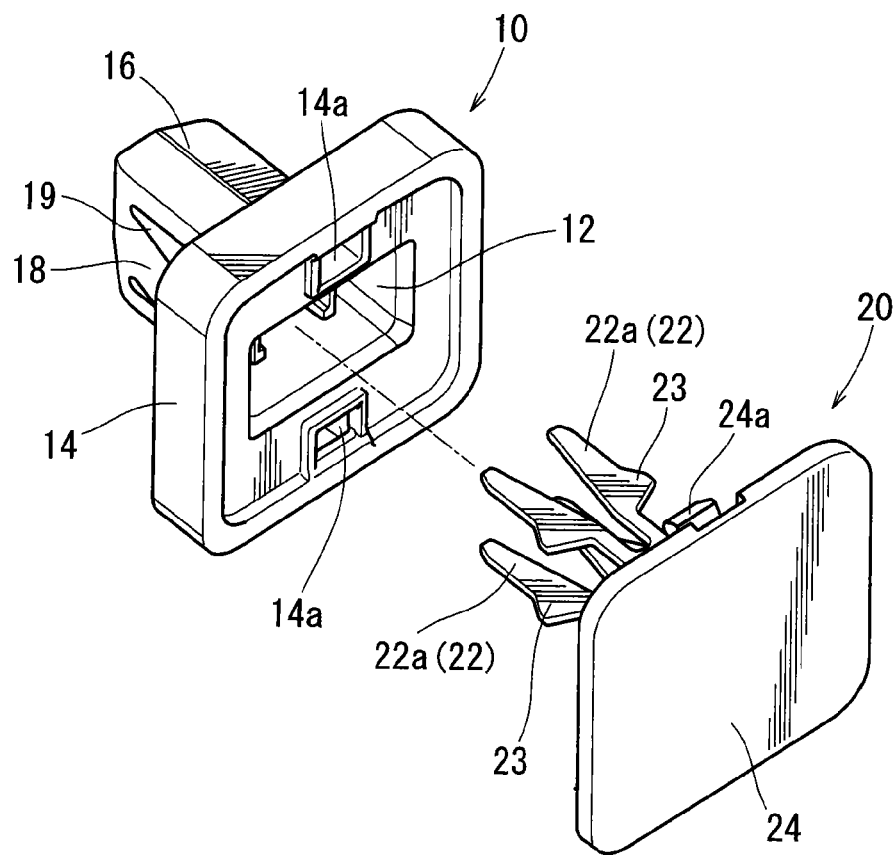
FIG. 3 is a perspective view of the clip, which illustrates a condition in which the main body and the pin member are separated from each other.
Figure 4:
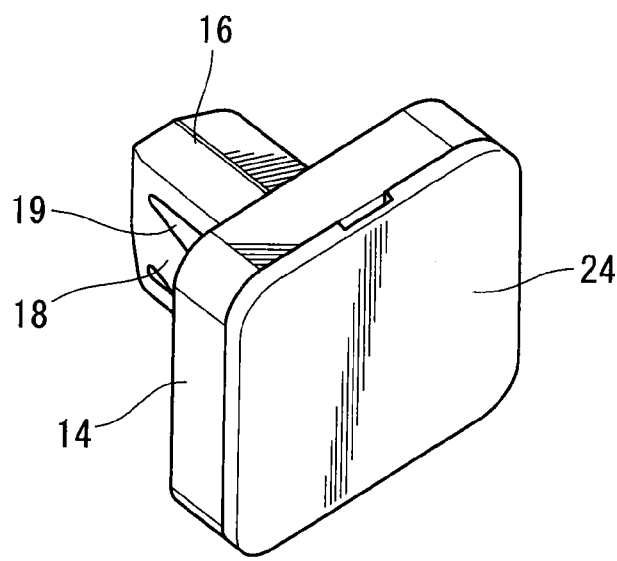
FIG. 4 is a perspective view of the clip, which illustrates a condition in which the main body and the pin member are temporary joined with each other.

As best shown in FIGS. 1 and 2, the clip is constructed of two members, i.e., a main body 10 and a pin member 20. Each of the main body 10 and the pin member 20 may preferably be integrally formed of resin. The main body 10 is composed of a (rectangular) base plate 14 that is formed in a proximal side thereof, and a rectangular tubular (hollow) anchor 16 that vertically extends from the base plate 14. As best shown in FIG. 3, a hollow interior portion of the anchor 16 is opened outside via a rectangular opening 12 formed in the base side of the main body 10. Further, the anchor 16 is closed in a distal end thereof. Outer shape and size of the anchor 16 is determined such that the anchor 16 can be inserted into a rectangular attaching hole 32 (FIGS. 6(A) to 6(C)) that is formed in a plate member 30 (e.g., a roof panel of a vehicle body panel). Further, as best shown in FIG. 3, the base plate 14 of the main body 10 has a pair of lock holes 14a that are oppositely positioned across the opening 12 (i.e., across the anchor 16) and pass through the same in a thickness direction (from a front side to a back side thereof).

As best shown in FIG. 1, the anchor 16 of the main body 10 has a pair of engagement claws 18 (one of which is shown) that are integrally formed in opposite side walls thereof. The engagement claws 18 are respectively separated from the side walls via slots (slits) 19 except for a portion (a proximal portion) that is positioned adjacent to the distal end of the anchor 16. Therefore, each of the engagement claws 18 is capable of elastically deforming (flexing) in an inward and outward direction of the anchor 16 about the proximal portion thereof due to elasticity of the resin.

As best shown in FIG. 1, the engagement claws 18 are respectively projected outwardly beyond outer surfaces of the side walls of the anchor 16, so as to respectively have inclined surfaces 18a and engagement surfaces 18b. Therefore, when the anchor 16 is inserted into the attaching hole 32 of the plate member 30, the inclined surfaces 18a of the engagement claws 18 are respectively capable of contacting inner circumferential periphery of the attaching hole 32 (FIG. 6(A)). When the inclined surfaces 18a pass through the attaching hole 32 while the engagement claws 18 are flexed inwardly, the engagement surfaces 18b of the engagement claws 18 are respectively capable of engaging a peripheral portion of the attaching hole 32 on a rear (inner) surface of the plate member 30 (FIG. 6(B)), which will be hereinafter described.

As best shown in FIGS. 2 and 3, the pin member 20 is composed of an elastic shank portion 22 and a covering member 24. The elastic shank portion 22 is capable of inserting into the interior portion of the anchor 16 via the opening 12 of the main body 10. Conversely, the covering member 24 may preferably have a profile corresponding to the base plate 14 of the main body 10.

As sown in FIGS. 2 and 3, the elastic shank portion 22 includes two (upper and lower) pairs of (i.e., four) elastic strips 22a. Each of the elastic strips 22a has a thickness that allows each of the elastic strips 22a to be entered into each of the slots 19 positioned in both sides of the engagement claws 18 of the anchor 16. The respective pairs of elastic strips 22a are arranged to form laterally spread V-shaped openings therebetween. Further, the elastic shank portion 22 has interfering portions 23 that are respectively projected laterally outwardly from outer peripheries of the elastic strips 22a. Further, each pair of elastic strips 22a of the elastic shank portion 22 has a common or integrated proximal end portion 22c. The proximal end portion 22c has a size and rigidity that is capable of preventing the engagement claws 18 of the anchor 16 from being flexed inwardly.

Figure 5:
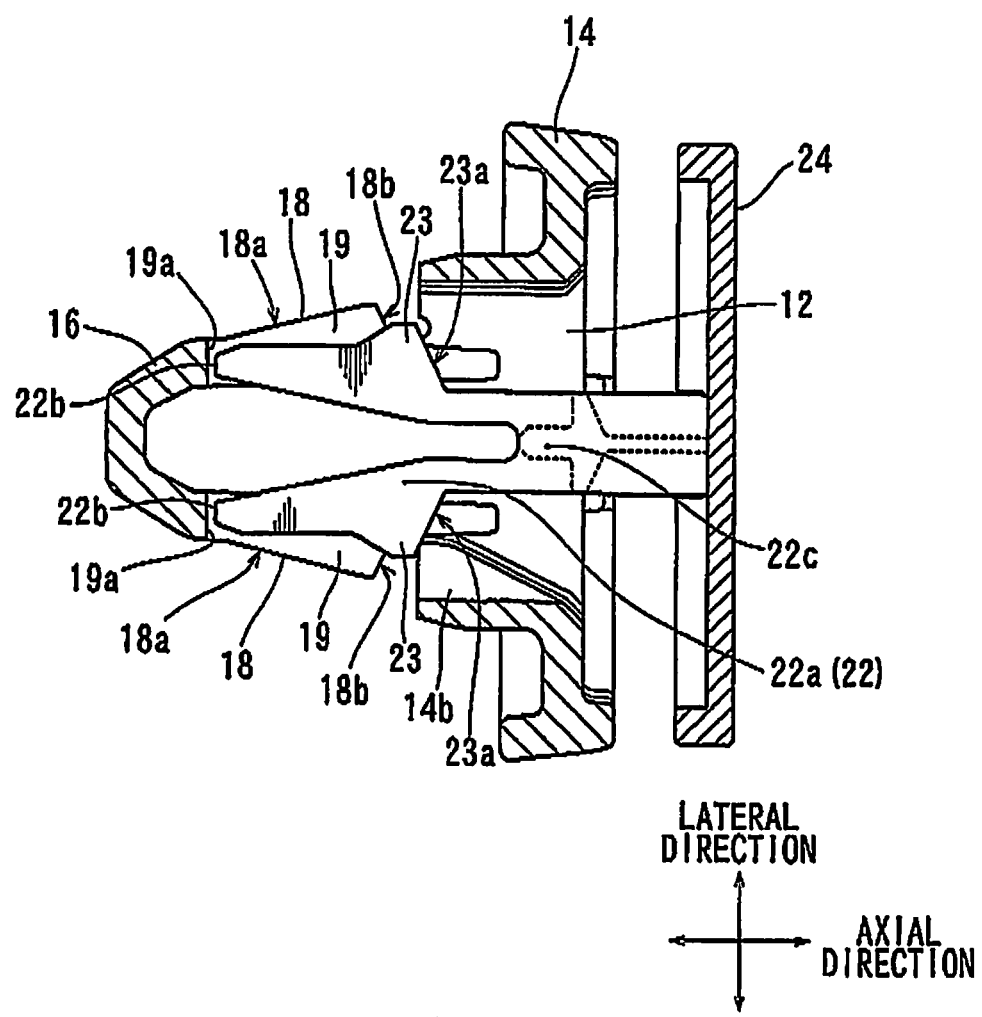
FIG. 5 is an axially cross-sectional view of the clip, which illustrates the condition in which the main body and the pin member are temporary joined with each other.
Figure 6A:
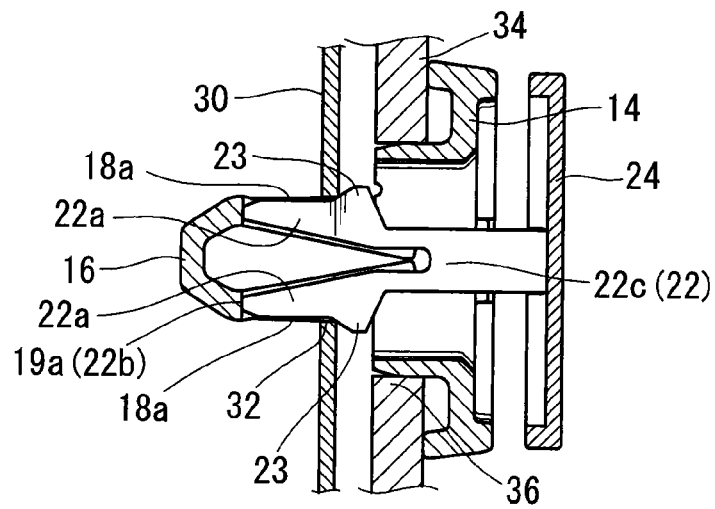
FIG. 6(A) is an axially cross-sectional view of the clip, which illustrates a first stage in an attaching operation of the clip.

As shown in FIG. 5, when the elastic shank portion 22 is inserted into the interior portion of the anchor 16 such that the main body 10 and the pin member 20 can be placed in a temporary joined condition, distal end portions 22b of the elastic strips 22a of the elastic shank portion 22 can be received (stopped) by end surfaces 19a (stoppers) of the slots 19. Thus, the elastic shank portion 22 (the pin member 20) can be held or locked in a temporary insertion position in the anchor 16 (i.e., the elastic shank portion 22 can be held in a temporary insertion condition), which position is shown in FIGS. 5 and 6(A). As shown in FIG. 5, in the temporary joined condition of the main body 10 and the pin member 20, two of inclined surfaces 23a of the interfering portions 23 engage two engagement blocks 14b (one of which is shown) that are projected from the base plate 14 into the opening 12. Thus, the main body 10 and the pin member 20 can be prevented from being separated from each other, so that the temporary joined condition thereof can be maintained. Further, the two engagement blocks 14b are positioned so as to correspond to the two elastic strips 22a that are positioned on diagonally opposite portions of the elastic shank portion 22.

The covering member 24 has a function that facilitates a work to insert the elastic shank portion 22 into the interior portion of the anchor 16. Additionally, the covering member 24 has a function that closely contacts the base plate 14 to cover the opening 12 of the main body 10, thereby increase an appearance of the clip. Further, as best shown in FIG. 2, the covering member 24 has a pair of lock claws 24a that are oppositely positioned across the elastic shank portion 22. As will be recognized, the lock claws 24a are positioned to correspond to the lock holes 14a of the base plate 14.

Figure 6B:
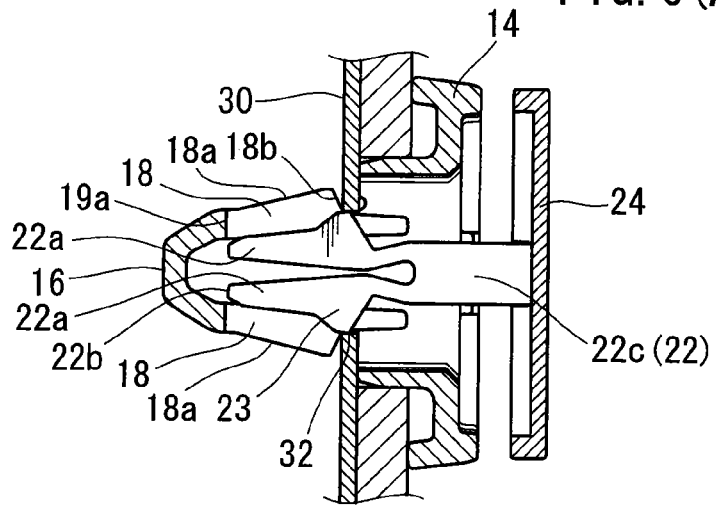
FIG. 6(B) is an axially cross-sectional view of the clip, which illustrates a second stage in the attaching operation of the clip.
Figure 6C:
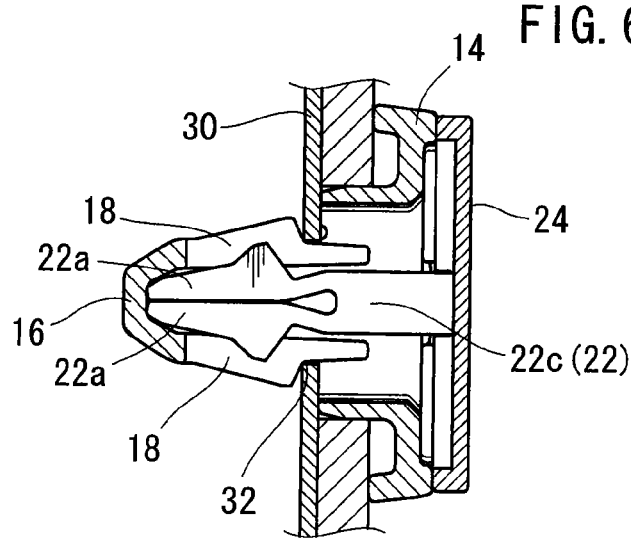
FIG. 6(C) is an axially cross-sectional view of the clip, which illustrates a third or final stage in the attaching operation of the clip.

Next, a method of closing the attaching hole 32 formed in the plate member 30 using the clip will now be described in detail with reference to FIGS. 6(A) to 6(C).

First, the elastic shank portion 22 is inserted into the interior portion of the anchor 16, so as to form the temporary joined condition of the main body 10 and the pin member 20 shown in FIG. 5. Thereafter, as shown in FIG. 6(A), the anchor 16 of the main body 10 is inserted into the attaching hole 32 of the plate member 30 via an insertion hole 36 formed in a roof cushion 34. At this time, as described above, the distal end portions 22b of the elastic strips 22a of the elastic shank portion 22 can be received by the end surfaces 19a of the slots 19, so that the elastic shank portion 22 (the pin member 20) can be locked in the temporary insertion position in the anchor 16. Further, in this condition, the inclined surfaces 18a of the engagement claws 18 of the anchor 16 contact the inner circumferential periphery of the attaching hole 32.

Next, the covering member 24 of the pin member 20 is pushed toward the attaching hole 32, so that the anchor 16 can be further pressed into the attaching hole 32 over a desired distance. As a result, as shown in FIG. 6(B), the inclined surfaces 18a of the engagement claws 18 of the anchor 16 pass through the attaching hole 32, so that the engagement surfaces 18b of the engagement claws 18 can engage the peripheral portion of the attaching hole 32 on the rear surface of the plate member 30. At the same time, the interfering portions 23 of the elastic shank portion 22 can interfere with the inner circumferential periphery of the attaching hole 32. As a result, the elastic strips 22a of the elastic shank portion 22 are flexed inwardly, so that the distal end portions 22b of the elastic strips 22a can be disengaged or spaced from the end surfaces 19a of the slots 19 of the anchor 16. Thus, a condition in which the pin member 20 (the elastic shank portion 22) is locked in the temporary insertion position can be released. That is, a locked condition of the pin member 20 (the elastic shank portion 22) in the temporary insertion position can be released. As a result, as shown in FIG. 6(C), the covering member 24 of the pin member 20 can be further pushed toward the attaching hole 32, so that the elastic shank portion 22 can be further pressed into the interior portion of the anchor 16 until the elastic shank portion 22 reaches a final position in the anchor 16.

When the elastic shank portion 22 of the pin member 20 is pressed into the anchor 16 of the main body 10 so as to be shifted from the temporary insertion position to the final position, the proximal end portions 22c of the elastic strips 22a of the elastic shank portion 22 (the connecting portion of the proximal end portions 22c) can be positioned between the engagement claws 18 of the anchor 16. As a result, the engagement claws 18 of the anchor 16 can be effectively prevented from being flexed inwardly. Therefore, an engagement condition of the engagement surfaces 18b of the engagement claws 18 to the peripheral portion of the attaching hole 32 can be maintained, so that the main body 10 (the clip) can be reliably attached to the plate member 30.

When the elastic shank portion 22 of the pin member 20 is inserted into the anchor 16 until the elastic shank portion 22 reaches the final position in the anchor 16, the lock claws 24a formed in the covering member 24 can engage the lock holes 14a formed in the base plate 14, so that the main body 10 and the pin member 20 can be locked. Further, in this condition, the covering member 24 of the pin member 20 can closely contact the base plate 14 of the main body 10, so as to close or cover the opening 12 of the main body 10.

Thus, when the pin member 20 is positioned in the temporary joined condition in which the elastic shank portion 22 is locked in the temporary insertion position, the elastic shank portion 22 cannot be inserted into the anchor 16 from the temporary insertion position toward the final position unless the anchor 16 of the main body 10 is suitably and sufficiently pressed into the attaching hole 32 of the plate member 30. However, when the engagement claws 18 of the anchor 16 pass through the attaching hole 32, the condition in which the pin member 20 (the elastic shank portion 22) is locked in the temporary insertion position can be released, so that the elastic shank portion 22 of the pin member 20 can be inserted into the anchor 16 until the elastic shank portion 22 reaches the final position in the anchor 16.

According to the clip of the present invention, when the anchor 16 of the main body 10 is not adequately pressed into the attaching hole 32 of the plate member 30, the elastic shank portion 22 of the pin member 20 can be effectively prevented from being inserted into the anchor 16 from the temporary insertion position toward the final position. As a result, the clip can always be reliably attached to the plate member 30. Therefore, the clip can be prevented from being dropped off from the attaching hole 32 even when an impact is applied thereto. The clip thus constructed is suitable for closing the attaching hole 32 that is formed in the plate member 30 (the roof panel) covered by the roof cushion 34 (i.e., that is not clearly seen externally.)

Further, in the embodiment, the end surfaces 19a of the slots 19 that define the engagement claws 18 of the anchor 16 are utilized as the stoppers that are capable of locking the elastic shank portion 22 of the pin member 20 in the temporary insertion position in the anchor 16 of the main body 10. Further, the interfering portions 23 of the elastic shank portion 22 are arranged and constructed to be projected or exposed to an exterior portion of the anchor 16 through the slots 19. Therefore, with regard to at least the man body 10 of the clip, a conventional main body can be used without any change.

Various changes and modifications may be made to the multiple press molding machine. For example, in the embodiment, the clip constructed of the main body 10 and the pin member 20 is used to close the hole (the unnecessary hole) formed in the plate member 30. However, the clip thus constructed can be used to fasten or combine two or more plate members utilizing the hole.

A representative example of the present invention has been described in detail with reference to the attached drawings. This detailed description is merely intended to teach a person of skill in the art further details for practicing preferred aspects of the present invention and is not intended to limit the scope of the invention. Only the claims define the scope of the claimed invention. Therefore, combinations of features and steps disclosed in the foregoing detailed description may not be necessary to practice the invention in the broadest sense, and are instead taught merely to particularly describe detailed representative examples of the invention. Moreover, the various features taught in this specification may be combined in ways that are not specifically enumerated in order to obtain additional useful embodiments of the present invention.

What is claimed is:

1. A clip comprising:
   a main body having a hollow anchor that is configured to be inserted into an attaching hole formed in a plate member,
   a pin member having an elastic shank portion that is inserted into an interior portion of the anchor,
   a pair of engagement claws formed in the anchor and respectively having proximal portions,
   a pair of elastic strips formed in the elastic shank portion and having a common proximal end portion, and
   a pair of interfering portions respectively formed in the elastic strips,
   wherein the engagement claws are formed by forming bottomed slots in opposite side walls of the anchor and are elastically deformable about the proximal portions in a lateral direction of the anchor,
   wherein the elastic strips are positioned laterally opposite to each other and are elastically deformable in a direction parallel to the deformation direction of the engagement claws,
   wherein the engagement claws respectively have inclined surfaces that are laterally projected beyond outer surfaces of the side walls of the anchor,
   wherein the interfering portions are respectively laterally projected beyond the outer surfaces of the side walls of the anchor in a temporarily joined condition of the main body and the pin member in which the elastic shank portion is inserted into the interior portion of the anchor,
   wherein distal end portions of the elastic strips contact end surfaces of the slots formed in the anchor in the temporarily joined condition of the main body and the pin member, and
   wherein the interfering portions are positioned on an outer side of the engagement claws in an axial direction of the anchor in the temporary joined condition of the main body and the pin member.

2. The clip as defined in claim 1, wherein the elastic strips are respectively received in the slots of the anchor.

3. The clip as defined in claim 1, wherein the elastic strips are arranged to form a laterally spread V-shaped opening there between.

* * * * *